United States Patent [19]

Kahmann

[11] 4,094,794

[45] June 13, 1978

[54] HYDROCYCLONE

[75] Inventor: Albrecht Kahmann, Weingarten, Germany

[73] Assignee: Escher Wyss GmbH, Ravensberg, Germany

[21] Appl. No.: 775,624

[22] Filed: Mar. 8, 1977

Related U.S. Application Data

[63] Continuation of Ser. No. 567,823, Apr. 14, 1975, abandoned.

[30] Foreign Application Priority Data

Apr. 16, 1974 Switzerland ......................... 5224/74

[51] Int. Cl.[2] ......................... B01D 21/26; B04C 3/06

[52] U.S. Cl. ................................ 210/512 R; 209/144; 209/211

[58] Field of Search ........................ 210/77, 78, 83, 84, 210/512 R, 512 M; 209/144, 211; 261/79 A, 91; 233/27; 55/201, 203, 204, 345–349, 459 R, 459 A, 459 B, 459 C, 459 D; 162/343

[56] References Cited

U.S. PATENT DOCUMENTS

| | | | |
|---|---|---|---|
| 3,172,844 | 3/1965 | Kurz | 210/512 R X |
| 3,186,513 | 6/1965 | Dunn et al. | 210/512 R X |
| 3,235,091 | 2/1966 | Doll et al. | 210/512 R |
| 3,439,810 | 4/1969 | Newman et al. | 210/512 R |
| 3,501,014 | 3/1970 | Fitch, Jr. et al. | 210/512 R |
| 3,696,934 | 10/1972 | Oisi | 210/512 R |
| 3,724,674 | 4/1973 | Loison | 210/512 R |
| 3,765,656 | 10/1973 | Tofaute | 261/91 X |
| 3,814,395 | 6/1974 | Kaelin | 261/91 X |

*Primary Examiner*—Frank W. Lutter
*Assistant Examiner*—Richard L. Chiesa
*Attorney, Agent, or Firm*—Kenyon & Kenyon, Reilly, Carr & Chapin

[57] ABSTRACT

The hydrocyclone is provided with a hollow rotor which is constructed in the form of a radial pump rotor and the outlet orifice of the rotor is disposed in a casing having a tangential outlet aperture. The bend in the rotor produces an increase in pressure during use so as to compensate for any pressure losses as well as to allow the use of a feed pump of low-pressure capacity. A disc is also mounted on the rotor in place of a seal to prevent heavy particles from entering the upper casing.

3 Claims, 1 Drawing Figure

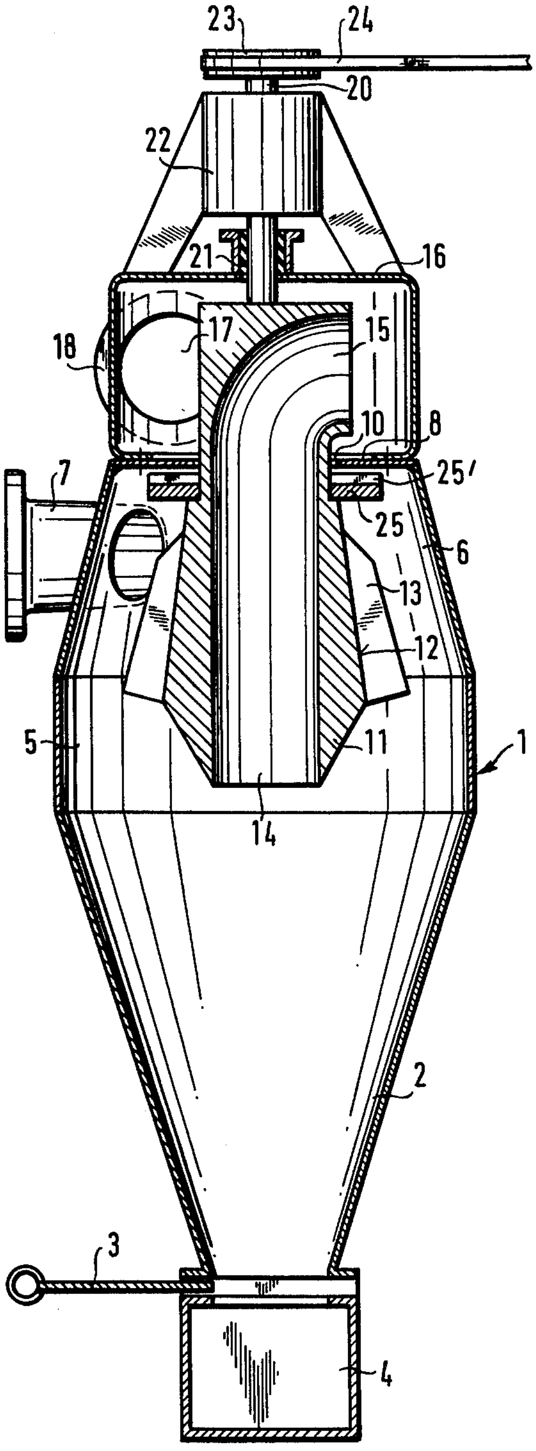
23
24
20
22
21
16
18
17
15
10
8
7
25'
25
6
13
12
5
11
1
14
2
3
4

HYDROCYCLONE

This is a continuation of application Ser. No. 567,823 filed Apr. 14, 1975 now abandoned.

This invention relates to a hydrocyclone. More particularly, this invention relates to a hydrocyclone for separating impurities from a fiber suspension and, particularly, for cleaning or purifying paper pulp.

Hydrocyclones for separating impurities from fiber suspensions have been known. For example, as described in German Auslegeschrift No. 1,226,540, one known type has a substantially vertical housing having a part which tapers conically in the downward direction and which is followed by a discharge chamber for collected impurities. In addition, a rotor is disposed in the top part of the housing and a tangential inlet duct for introducing a suspension to be purified is situated in the region of the rotor. The rotor is made hollow and contains an axial outlet duct for the purified suspension.

However, the known hydrocyclones have usually required feed pumps which deliver the fiber suspension to be of relatively high pressure. In addition, the drive for the rotors have been of relatively complex construction.

Accordingly, it is an object of the invention to provide a hydrocyclone with a simple drive.

It is another object of the invention to provide a hydrocyclone for purifying fiber suspensions which reliably guides the purified fiber suspension out of the hydrocyclone.

It is another object of the invention to eliminate the need for a feed pump for supplying fiber suspensions to a hydrocyclone.

It is another object of the invention to decrease the power requirements of a feed pump used for supplying fiber suspensions to a hydrocyclone.

Briefly, the invention provides a hydrocyclone for separating impurities from fiber suspensions which includes a substantially vertical housing, an inlet duct, a collecting chamber in the housing, a hollow rotor and a casing. The housing includes a lower part which tapers conically in a downward direction and an upper part to which the inlet duct is tangentially connected for introducing a fiber suspension thereinto. The collecting chamber is connected to the lower part of the housing to collect separated impurities. The hollow rotor is rotatably mounted within the upper part of the housing in the region of the inlet duct and defines an outlet duct which extends into the upper housing part. An outlet orifice of the duct is located outside the upper housing part and is directed in a radial outward direction while the casing surrounds the orifice. The casing also has a tangential outlet aperture for exhausting of the purified suspension.

The outlet end of the hollow rotor is constructed in the style or form of a radial pump rotor. That is, the outlet duct in the rotor includes an axial lower portion and an upper portion extending angularly, for example 90°, relative to the axial lower portion before terminating at the outlet orifice. The resulting deflection of the duct in the rotor produces an increased pressure so that the pressure losses otherwise occurring are eliminated. In some cases, special advantages can also be obtained by the suction action of the resulting pump because the feed pump supplying the suspension to the hydrocyclone may have a lower pressure to which the hydrocyclone is subjected.

Preferably, the pump rotor may have the form of a tube bend having a duct bent through 90°. This system, which is conventional for thick pulp pumps, gives a pump rotor which is substantially insensitive to clogging. However, in cases where there is no risk of clogging because of the nature of the suspension being delivered, it is possible of course to use other forms of rotors which may be more favorable as regards flow conditions.

In addition, a centrifugal disc is disposed on the rotor in the housing adjacent the top end wall. This centrifugal disc readily prevents heavy particles from passing out of the housing containing unpurified suspension into the pump casing containing the purified suspension. A reverse flow from the pump casing to the housing does not have any adverse effect, provided the flow does not exceed a given amount, since only part of the already purified suspension is returned to the unpurified suspension.

These and other objects and advantages of the invention will become more apparent from the following detailed description and appended claims taken in conjunction with the accompanying drawing in which:

The drawing illustrates a sectional view of a hydrocyclone according to the invention.

Referring to the drawing, the hydrocyclone for cleaning fiber suspensions, more particularly paper pulp, comprises a separator housing 1 having a lower part 2 which tapers conically in the downward direction. This conical part 2 connects via an emptying valve 3 with a collecting chamber 4 for the separated impurities. The chamber 4 can be emptied from time to time via a shut-off element (not shown).

The middle cylindrical part 5 of the separator housing 1 is connected to an upper conical part 6 which tapers in the upward direction. An inlet duct 7 for the supply of suspension for cleaning connects tangentially into the upper part 6 of the housing 1. The top of the separator housing 1 is closed by an end wall 8 formed with a round aperture 10.

A rotor 11 extends through the aperture 10 of the housing 1 with a slight clearance. This rotor 11 has a conical surface 12 with blades 13. The surface 12 and the blades 13 extend approximately parallel to the wall of the upper part 6 of the separator housing 1. The rotor 11 is also provided with an outlet duct 14 which extends beyond the region of the aperture 10 and then has a portion 15 bent through 90° to terminate at an outlet orifice which is directed radially outwards. As shown, the lower portion of the duct 14 is axially disposed about a vertical longitudinal axis.

The upper part of the rotor containing the bent portion 15 of the duct 14 is situated in a pump casing 16 which is connected to the end wall 18 of the separator housing 1. The pump casing 16 may be of spiral shape or, as shown, cylindrical. An outlet conduit 17 with a flange 18 extends tangentially outwards from a tangential outlet aperture in the pump casing 16.

The rotor 11 is provided with a shaft 20 which extends out of the pump casing 16 through a seal 21 and is mounted for rotation in bearings (not shown) in a bearing housing 22. A belt pulley 23 is secured to the top end of the shaft 20 and the rotor 11 can be driven via the pulley by a belt 24 and a motor (not shown).

During operation, a fiber suspension to be cleaned, for example pulp having heavy particle impurities is fed to the hydrocyclone via the inlet conduit 7 which is below the aperture 10. Rotation of the rotor 11 causes the heavy particles to be centrifuged out of the flow and they move into the lower part 2 and then into the collecting chamber 4. The purified suspension rises in the housing 1 at the center of the vortex and flows into the outlet duct 14 of the rotor 11. The suspension is centrifuged outwards in the end portion 15 of the duct 14 and can be discharged from the pump casing 16 via the outlet duct 17.

As shown, a centrifugal disc 25 is rigidly connected to the rotor 11 in the separator housing 1 above the inlet 7 in the immediate vicinity of the top end wall 8 and below and in facing relation to the casing 16. The centrifugal disc 25 replaces a seal between the pump casing 16 and the separator housing 1 and prevents heavy impurity particles from penetrating from the separator housing 1 into the pump casing 16 if the casing 16 is at a lower pressure. Any flow of suspension without heavy particles through the aperture 10, particularly a slight return flow of purified suspension from the pump casing 16 back to the separator housing 1, does not have any adverse effect. No separate seal is therefore required at that point.

As shown, the centrifugal disc 25 may be provided with fins 25' which are situated on that side of the disc which faces the end wall 8. These fins 25' greatly enhance the operation of the disc 25. The fins 25' may be radial or extend at an angle. That side of the centrifugal disc 25 which is remote from the end wall 8 may also be provided with fins (not shown). In some cases, however, the centrifugal disc 25 may be completely smooth.

The optimum result with respect to centrifugal action and a short overall height for the hydrocyclone is obtained with a radial pump rotor whose upper portion 15 leads into the casing 16 at right angles to the hydrocyclone axis as shown in the drawing. However, a certain axial component is of course permissible for the exit velocity of the purified suspension from the pump rotor. That is, the upper portion 15 may extend angularly of the axis of the lower axial portion 14.

What is claimed is:

1. A hydrocyclone for separating impurities from a fiber suspension comprising a housing defining a separation chamber and having an aperture at an upper end, an inlet duct connected tangentially to an upper part of said housing below said aperture for introducing a fiber suspension directly into said separation chamber, a hollow rotor rotatably mounted in said housing, said rotor defining an outlet duct extending from below said inlet duct along a longitudinal axis from said separation chamber through said aperture with a clearance to an upper portion outside said separation chamber, said upper portion extending in an outward direction angularly of said longitudinal axis and terminating at an orifice, a casing surrounding said orifice of said rotor and having a tangential outlet aperture therein for exhausting of a purified suspension, and a centrifugal disc mounted on said rotor within said housing above said inlet, said disc being disposed below and in facing relation to said casing and said aperture of said housing upper part for preventing passage of heavy particles from said housing through said aperture into said casing, said disc including a plurality of fins thereon extending towards said casing.

2. A hydrocyclone for separating impurities from fiber suspension comprising a substantially vertical housing having a lower part tapering conically in a downward direction and an upper part having an aperture therein;

an inlet duct connected tangentially to said upper part of said housing below said aperture for introducing a fiber suspension directly into said upper part;

a collecting chamber connected to said lower part for collecting separated impurities;

a hollow rotor rotatably mounted within said upper part of said housing in the region of said inlet duct, said rotor defining an outlet duct having an axially disposed lower portion extending through said aperture with a clearance into said upper housing part and an upper bent portion extending radially outwardly to terminate at an outlet orifice outside said upper part;

a casing surrounding said orifice of said rotor and having a tangential outlet aperture therein for exhausting of the purified suspension; and a centrifugal disc mounted on said rotor within said housing above said inlet, said disc being disposed below and in facing relation to said casing and said aperture of said housing upper part for preventing passage of heavy particles from said housing through said aperture into said casing, said disc including a plurality of fins thereon extending towards said casing.

3. A hydrocyclone as set forth in claim 2 wherein said upper portion extends 90° relative to said axial lower portion.

* * * * *

UNITED STATES PATENT AND TRADEMARK OFFICE

CERTIFICATE OF CORRECTION

PATENT NO. : 4,094,794

DATED : June 13, 1978

INVENTOR(S) : Albrecht Kahmann

It is certified that error appears in the above-identified patent and that said Letters Patent are hereby corrected as shown below:

Column 2, line 54, change "18" to --8--

Signed and Sealed this

*Twenty-eighth* Day of *November 1978*

[SEAL]

*Attest:*

RUTH C. MASON
*Attesting Officer*

DONALD W. BANNER
*Commissioner of Patents and Trademarks*